(12) United States Patent
Peterson et al.

(10) Patent No.: US 7,713,334 B1
(45) Date of Patent: May 11, 2010

(54) PROCESS FOR REMOVING EPOXIDES

(75) Inventors: Gregory W. Peterson, Belcamp, MD (US); Christopher J. Karwacki, Churchville, MD (US); Joseph A. Rossin, Columbus, OH (US); William B. Feaver, Columbus, OH (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 118 days.

(21) Appl. No.: 11/869,349

(22) Filed: Oct. 9, 2007

Related U.S. Application Data (60) Provisional application No. 60/863,250, filed on Oct. 27, 2006.

(51) Int. Cl.
*B01D 53/02* (2006.01)
(52) U.S. Cl. .............................. 95/141; 95/143; 423/700
(58) Field of Classification Search .................. 95/141, 95/143; 423/700
See application file for complete search history.

(56) References Cited

U.S. PATENT DOCUMENTS 4,526,767 A * 7/1985 Robinson et al. ............ 423/702
5,074,892 A * 12/1991 Leavitt ........................... 95/96
6,837,917 B2 * 1/2005 Karwacki et al. ............. 95/128
2007/0062369 A1 * 3/2007 Pfenninger et al. ............. 95/90

OTHER PUBLICATIONS

Groen, J., et al, "Optimal Alumin-Assisted Mesoprosity Developmemt in MFI Zeolites by Desilication" J. Phys Chem B 2004, 108; pp. 13062-13065.

Groen, J., et al, "Creation of Hollow Zeolite Architectures by Controlled Desilication of Al-Zones ZSM-5 Crystals"; J. Am. Chem. soc. 2005, 127, pp. 10792-10793.

* cited by examiner

*Primary Examiner*—Robert J Hill, Jr.
*Assistant Examiner*—Christopher P Jones
(74) *Attorney, Agent, or Firm*—Ulysses John Biffoni; Herbert C. Rose (57) ABSTRACT

A process for removing epoxides from a process stream over a wide range of temperature and relative humidity, comprising the step of contacting the process stream with a filtration media comprising an acid form of a mesoporous zeolite produced from pentasil zeolite treated with a caustic agent, for a sufficient time to remove the epoxides therefrom.

25 Claims, 1 Drawing Sheet

FIG. 1

PROCESS FOR REMOVING EPOXIDES

RELATED APPLICATIONS

This application claims the benefit of priority from U.S. Provisional Application Ser. No. 60/863,250, filed Oct. 27, 2006.

GOVERNMENT INTEREST

The invention described herein may be manufactured, used and licensed by or for the U.S. Government.

FIELD OF THE INVENTION

The present invention relates to a process for removing epoxides such as, for example, ethylene oxide, propylene oxide, and related compounds from process streams such as ambient air streams over a wide range of temperature and relative humidity.

BACKGROUND OF THE INVENTION

Among the class of epoxides, ethylene oxide, also known as EO, EtO, ETO, anprolene, dihydrooxirene, 1,2-epoxyethane, oxacyclopropane, oxane, oxidoethane, oxiran, is an industrial chemical used in sterilizing medical items, fumigating spices, and manufacturing other chemicals. Pure ethylene oxide is a colorless gas at room temperature and a mobile, colorless liquid below 54° Fahrenheit. Sold as a mixture with either carbon dioxide or fluorocarbon 12, ethylene oxide has been used as an antimicrobial pesticide since the 1940s. Ethylene oxide kills microorganisms by denaturing their proteins and subsequently modifying their molecular structure. This activity allows ethylene oxide to be effective as a sterilant.

Ethylene oxide is known to be highly toxic. The acute (short-term) effects of ethylene oxide in humans consist mainly of central nervous system (CNS) depression and irritation of the eyes and mucous membranes, and nausea, vomiting, neurological disorders including seizures, convulsions and coma, bronchitis, pulmonary edema, and emphysema at high concentrations. Chronic (long-term) exposure to ethylene oxide in humans can cause irritation of the eyes, skin, and mucous membranes, and problems in the functioning of the brain and nerves. Some human cancer data show an increase in the incidence of leukemia, stomach cancer, cancer of the pancreas, and Hodgkin's disease in workers exposed to ethylene oxide.

The US Department of Labor Occupational Safety and Health Administration ("OSHA") has set stringent guidelines aimed at protecting workers performing operations in an environment potentially contaminated with ethylene oxide. The Permissible Exposure Limit ("PEL") for ethylene oxide has been established at 1.8 mg/m$^3$ (approximately 1 ppm). As a result, effective, low cost means of removing ethylene oxide from ambient streams of air is needed.

One method of removing ethylene oxide from ambient streams of air is to use impregnated, activated carbon as a filtration media. The impregnated, activated carbon is known to exhibit a strong affinity for a wide variety of organic chemicals in an ambient air stream. However, under conditions of high relative humidity (i.e., greater than about 50% relative humidity), the absorption capacity of impregnated, activated carbon is largely restricted. Under such conditions, the excessive amount of water vapor severely hampers the ability of the activate carbon to effectively absorb organic chemicals including ethylene oxide.

Depending on the environment and environmental conditions, the water content associated with ambient air can vary over a wide range, from less than about 5% to greater than about 95% relative humidity (RH). Although a number of media, such as, for example, activated carbon and resins, are capable of removing ethylene oxide from dry air, these materials fail to effectively filter ethylene oxide under conditions of high relative humidity.

For this reason, there is a need to provide an enhanced process for removing epoxides including ethylene oxide, propylene oxide, and related compounds from process streams (e.g., ambient air streams) over a wide range of temperature and relative humidity, and especially in the presence of high relative humidity. There is a further need for an enhanced process for removing epoxides including ethylene oxide, propylene oxide, and related compounds from process streams (e.g., ambient air streams) that is relatively cost efficient, safe and easy to make, use or implement, and does not require extensive handling, maintenance and care.

SUMMARY OF THE INVENTION

The present invention relates to a process for removing epoxides including ethylene oxide, propylene oxide, and related compounds from process streams (e.g., ambient air streams) over a wide range of temperature and relative humidity. The process of the present invention utilizes a zeolite-based filtration media, which exhibits enhanced capacity for effectively and efficiently removing ethylene oxide, propylene oxide, and related compounds from ambient air streams passing therethrough, particularly under conditions of high relative humidity. In particular, the zeolite-based filtration media of the present invention is produced from zeolite, preferably from the pentasil family (e.g. ZSM-5 or MFI), treated with a caustic agent to produce mesoporous zeolite, and thereafter converted into an acid form using techniques well known to one skilled in the art. The treatment of zeolite with the caustic agent has been determined to greatly enhance porosity, specifically in the mesoporous range of from about 2-50 nm, resulting in enhanced removal of epoxide (e.g., ethylene oxide and propylene oxide). The process of the present invention is cost efficient, safe and easy to implement.

According to one embodiment, the present invention comprises a process for removing epoxides including ethylene oxide from air over a wide range of relative humidity conditions. The process of the present invention comprises contacting an air stream with zeolite of the pentasil family, members that include zeolite ZSM-5, ZSM-8, ZSM-11, and the like, that has been treated to enhance the porosity, for a sufficient time to remove EtO. Zeolite ZSM-5 is the preferred zeolite. Treatments to enhance the porosity of ZSM-5 include slurrying the as-synthesized zeolite in a caustic solution of sufficient concentration and at a temperature and contact time sufficient to dissolve a portion of the silica from the lattice of the zeolite. Zeolite ZSM-5 treated in this manner is also referred to as "pore size modified ZSM-5" or "mesoporous ZSM-5" (m-ZSM-5). The m-ZSM-5 is acidified via suitable methods, such as for example ion exchange with nitric acid, ammonium nitrate, ammonium chloride, and the like, followed by subsequent calcinations, to yield a "pore size modified zeolite H-ZSM-5" or "acidified mesoporous ZSM-5" (m-H-ZSM-5).

The term "mesopores" as used herein is intended to refer to tiny pores at least 2 nanometers in diameter, and preferably from about 2 nanometers to 50 nanometers in diameter, located within a substrate used to filter fluids. The term "mesoporous" as used herein is intended to describe a structure containing mesopores.

The term "calcining" as used herein refers to the process of heating a substance to a high temperature, but below the melting or fusing point of the substance, causing loss of moisture, reduction or oxidation, and the decomposition of carbonates and other organic compounds. Generally, the calcining temperature of zeolite is from about 750° F. (400° C.) to 1200° F. (650° C.).

The term "caustic agent" is intended to encompass a base, preferably a strong base, which hydrolyzes completely, raising the pH of a solution towards 14. Suitable strong bases include potassium hydroxide, barium hydroxide, cesium hydroxide, sodium hydroxide, strontium hydroxide, calcium hydroxide, lithium hydroxide, rubidium hydroxide, and combinations thereof, and the like. Sodium hydroxide is the preferred caustic agent.

In one aspect of the present invention, there is provided a process for removing epoxides from a process stream over a wide range of temperature and relative humidity, comprising the step of contacting the process stream with a zeolite-based filtration media including an acid form of a mesoporous zeolite produced from pentasil zeolite treated with a caustic agent, for a sufficient time to remove the epoxide therefrom (m-H-pentasil zeolite).

In another aspect of the present invention, there is provided a process for removing epoxides, amines and/or aldehydes from a process stream over a wide range of temperature and relative humidity, comprising the step of contacting the process stream with an acid form of a mesoporous zeolite produced from pentasil zeolite treated with a caustic agent, for a sufficient time to remove the epoxides, amines and/or aldehydes therefrom, wherein said mesoporous zeolite further comprises a compound impregnated therein selected from the group consisting of sulfates, fluorides, chlorides, nitrates, metal salts, acids and precursors thereof, and combinations thereof.

BRIEF DESCRIPTION OF THE DRAWING

The following drawing is illustrative of embodiments of the present invention and is not intended to limit the invention as encompassed by the claims forming part of the application:

DETAILED DESCRIPTION OF THE INVENTION

The present invention is directed generally to a process for removing epoxides including ethylene oxide, propylene oxide, and related compounds from process streams (e.g., ambient air streams) over a wide range of temperature and relative humidity. The process of the present invention utilizes m-H-ZSM-5 based filtration media, which exhibits enhanced capacity for effectively and efficiently removing ethylene oxide, propylene oxide, and related compounds from ambient air streams passing therethrough, particularly under conditions of high relative humidity. In particular, the ZSM-5-based filtration media of the present invention is produced from ZSM-5 treated with a caustic agent to produce mesopores within the structure of the zeolite, and thereafter converted into an acid form. The treatment of zeolite with the caustic agent has been determined to greatly enhance porosity, specifically in the range of from about 2-50 nm, resulting in enhanced removal of epoxide (e.g., ethylene oxide). The process of the present invention is cost efficient, safe and easy to implement.

In one embodiment of the present invention, there is provided a process for removing epoxides from a process stream over a wide range of temperature and relative humidity, comprising the step of contacting the process stream with a zeolite-based filtration media including an acid form of a mesoporous zeolite produced from pentasil zeolite treated with a caustic agent, for a sufficient time to remove the epoxide therefrom.

Often times, it is desired that the removal material be capable of removing a range of chemicals from streams of air, such as for example, epoxides, basic chemicals, and the like. The novel process described herein is able to filter epoxides such as, for example, ethylene oxide and propylene oxide, because the removal is facilitated by the absorption of EtO into the pores of the acidified mesoporous zeolite where a chemical reaction occurs at the zeolitic acid sites. The chemical reaction is believed to result in the hydrolysis of EtO into ethylene glycol. Further, because the novel process described herein employs acid sites to remove ethylene oxide, the novel process can also be applied to the removal of additional classes of basic chemicals, such as, for example amines (e.g. ammonia), from streams of air. Further, the novel process can be applied to multiuse applications, such as for example applications requiring the removal of multiple epoxides, or removal of ethylene oxide plus additional basic chemicals from streams of air.

The m-H-pentasil zeolite filtration media of the present invention have been specially treated to enhance removal of epoxides, especially under conditions of high relative humidity. This greatly facilitates improved isolation, handling and subsequent processing of the toxic products in a rapid and efficient manner, and operates to extend the absorption range, capability and reliability of currently available methods and procedures. More specifically, the kinetic properties of the present invention are greatly enhanced due to the formation of mesopores, which act as feeder pores or conduits for passage of epoxides including ethylene oxide, propylene oxide, and related compounds and other toxic industrial chemicals. Notable improvements of filtration performance have been observed as compared to untreated zeolite. The m-H-pentasil zeolite filtration media is preferably in the form of a particle, a bead or an extrusion.

Broadly, the process of the present invention utilizes an m-H-pentasil zeolite filtration media effective for removing epoxide from process streams. Various methods can be used for material preparation. The zeolite may be synthesized in template-free form or synthesized using template, e.g., tetrapropylammonium bromide (TPABr) as used in the synthesis of zeolite ZSM-5. The preferred zeolite is selected from the pentasil family, more preferably ZSM-5, ZSM-8, ZSM-11 or combinations thereof, and the like, and most preferably ZSM-5.

The term "mesopores" as used herein is intended to refer to pores at least 2 nanometers in diameter, and preferably from about 2 nanometers to 50 nanometers in diameter, located within a substrate used to filter fluids. The term "mesoporous" as used herein is intended to describe a structure containing mesopores.

The term "calcining" as used herein refers to the process of heating a substance to a high temperature, but below the melting or fusing point of the substance, causing loss of moisture, reduction or oxidation, and the decomposition of carbonates and other organic compounds. Generally, the calcining temperature of zeolite is from about 750° F. (400° C.) to 1200° F. (650° C.).

The term "caustic agent" is intended to encompass a base, preferably a strong base, which hydrolyzes completely, raising the pH of a solution towards 14. Suitable strong bases include potassium hydroxide, barium hydroxide, cesium hydroxide, sodium hydroxide, strontium hydroxide, calcium hydroxide, lithium hydroxide, rubidium hydroxide, and combinations thereof, and the like.

The process of the present invention utilizes a filtration media including an acid form of a mesoporous zeolite. The mesoporous zeolite used in the present invention comprises a surface area of at least 350 m$^2$/g, and a pore volume of at least 0.20 cm$^3$/g.

The aluminum content of the zeolite (ZSM-5 being the preferred zeolite) employed in this invention will greatly affect the performance of the resulting filtration media. For example, acidified ZSM-5 containing a minimal amount of aluminum ($SiO_2/Al_2O_3$ greater than about 1,000) will not effectively filter ethylene oxide because of the small number of acid sites. Therefore, it is desired that the $SiO_2/Al_2O_3$ ratio of the ZSM-5 employed in the present invention be less than about 200, with the preferred $SiO_2/Al_2O_3$ ratio ranging from about 30 to 90.

In another embodiment of the present invention, the filtration media can be further adapted to remove EtO and basic chemicals including aldehydes such as, for example, formaldehyde, and amines such as, for example, ammonia, from process streams (e.g., ambient air streams) by impregnating the filtration media with a compound selected from sulfates, fluorides, chlorides, nitrates, metal salts, acids and precursors thereof, and combinations thereof. Suitable acids can be selected from sulfuric acid, hydrochloric acid, ammonium bisulfate, ammonium chloride, ammonium fluoride, ammonium nitrate, citric acid, formic acid, and combinations thereof.

The m-H-pentasil zeolite filtration media of the present invention is adapted for removing epoxides including ethylene oxide, propylene oxide, and related compounds from process streams including ambient air streams over a wide range of temperatures and relative humidity. The relative humidity of the process stream can range from about 5% to 95% and the temperature of the process stream can range from about −25° F. (−13° C.) to 125° F. (52° C.).

The m-H-pentasil zeolite filtration media employing the acidified, pore size modified zeolite (acid form of the mesoporous zeolite) is suitably configured for promoting contact with the stream being treated. The linear velocity by which the EtO contaminated air stream passes through the acidified, pore size modified zeolite contained in the filtration media, will be a function of the many parameters, such as, for example, the bed depth, the ambient concentration of EtO, flow rate, and the like.

The pore size modified, acidified zeolite (acid form of the mesoporous zeolite) of the present invention functions effectively at water content of the process stream (e.g., ambient air stream) between about 5% and about 95% relative humidity (RH). At RH below about 5%, insufficient water may be present in the process stream to effectively remove EtO via hydrolysis. As the RH is increased above 95%, the effectiveness of the removal media becomes less than optimal. Should the RH fall below the specified range, water may be added to the process to increase the RH. Alternatively, should the RH level be too high (greater than about 95% RH), the process stream may be mildly heated to decrease the RH.

The temperature of the process stream (e.g., ambient air stream) should be from about −25° F. to 125° F. The contact time between the acidified, pore size modified zeolite and the process stream being treated can vary greatly depending on the nature of the application, such as for example, the desired filtration capacity, flow rates, concentration of EtO in the ambient air stream, and the like. However, in order to achieve a threshold level of EtO removal, the contact time (e.g., bed depth divided by the linear velocity) should be greater than about 0.025 s. A contact time of greater than 0.2 seconds is preferred for most applications, and a contact time of greater than 0.5 seconds is even more preferred for applications involving high concentrations of EtO, or for applications where it is desired to achieve a high EtO capacity in, e.g., a filter bed.

In a further embodiment of the present invention, there is provided a process for removing epoxides, amines and/or aldehydes from a process stream over a wide range of temperature and relative humidity, comprising the step of contacting the process stream with an acid form of a mesoporous zeolite produced from pentasil zeolite treated with a caustic agent, for a sufficient time to remove the epoxides, amines and/or aldehydes therefrom, wherein said mesoporous zeolite further comprises a compound impregnated therein selected from the group consisting of sulfates, fluorides, chlorides, nitrates, metal salts, acids and precursors thereof, and combinations thereof. Suitable acids can be selected from sulfuric acid, hydrochloric acid, ammonium bisulfate, ammonium chloride, ammonium fluoride, ammonium nitrate, citric acid, formic acid, and combinations thereof.

As-prepared and with subsequent ion exchange, the acid form of the mesoporous zeolite exists as small crystals. According to various embodiments of the present invention, the m-H-pentasil zeolite may be configured in the form of particles, rings, cylinders, spheres and the like. Alternatively, the m-H-pentasil zeolite may be configured as a monolith, or coated onto the walls of a ceramic material, such as for example honeycomb corderite. Failure to configure the m-H-pentasil zeolite as described above will result in excessive pressure drop across the filtration media. Configuring the m-H-pentasil zeolite into various geometrical shapes can be performed using operations well known to one skilled in the art. These techniques include pilling, extruding, and the like. Binders, such as for example clays, silicates, plastics, and the like, may or may not be required for the given application, however, the use of binders in the formation of m-H-pentasil zeolite rings, particles, and the like, is preferred.

The m-H-pentasil zeolite-based filtration media can be adapted for use in a filtration device arranged in a manner where the process stream containing epoxide can flow through and in contact with the m-H-pentasil zeolite-based filtration media. The epoxide is rapidly absorbed into the mesopores of the zeolite-based filtration media and hydrolyzed into harmless products. The filtration device comprising the m-H-pentasil zeolite-based filtration media can comprise any shape or geometric form depending upon the application so long as the filtration device facilitates and promotes contact of the process stream with the m-H-pentasil zeolite-based filtration media. The linear velocity of the process stream passing through the m-H-pentasil zeolite-based filtration media is a function of several parameters including bed depth, ambient concentration of epoxide, flow rate and the like.

Examples of such filtration devices include, but are not limited to, gas masks, canisters, respirators, filter banks such as those employed in fume hoods, ventilation systems and the like. A blower motor, fan, or the like, can be used as a means for forcing the process stream through the device, if needed.

Treatment of the pentasil zeolite, such as for example ZSM-5, using caustic solution is the key to the novel process described herein. Although not wishing to be bound by any particular theory, it is believed that the caustic treatment operates to dissolve silica from the pores of the zeolite crystal. Dissolution of the silica creates voids, or mesopores within the zeolite crystal structure. These voids are believed to enhance intrazeolitic mass transfer, leading to improved EtO filtration performance.

The process for making the m-H-pentasil zeolite-based filtration media useful for removing epoxides from a process stream over a wide range of temperature and relative humidity, comprises the steps of treating zeolite with a caustic agent to produce a mesoporous zeolite, neutralizing the pH of the mesoporous zeolite, and converting the mesoporous zeolite into an acid form. The m-H-pentasil zeolite-based filtration media comprises zeolite, preferably of the pentasil family, and more preferably selected from ZSM-5, ZSM-8, and ZSM-11, and most preferably, ZSM-5.

More specifically, the treatment of a pentasil zeolite using caustic solution is performed by slurrying the zeolite in a caustic solution, such as for example sodium hydroxide or potassium hydroxide, or combinations thereof, to produce mesoporous zeolite. The optimization of the porosity is a function of several factors, such as for example the nature of the caustic agent (e.g., sodium, hydroxide, potassium hydroxide), the normality of the solution, the temperature of the solution, the duration of the contact and the concentration of zeolite in the slurry.

The caustic agent employed in the preparation of the caustic solution is capable of increasing the pH of the slurry to greater than 9.0 and preferably greater than 10. Examples of caustic agents include, but are not limited to, sodium hydroxide and potassium hydroxide. Sodium hydroxide is the preferred caustic solution. Organic bases, such as sodium citrate, may also be employed but are less preferred. The concentration of caustic in solution may be varied from about 0.001N to 10N, with the preferred range extending from about 0.1N to 1.0N. The temperature of the solution may be varied from room temperature to boiling, with the preferred range extending from about 120° F. (50° C.) to 190° F. (90° C.). The duration of the contact (i.e. amount of time the zeolite remains in the slurry) may be varied from as little as less than 5 minutes to greater than several days; however, the preferred contact duration is less than 2 hours.

The amount of zeolite suspended in the caustic solution can affect the extent of the pore size modification. The preferred ratio of zeolite to solution is from about 1 g zeolite to 25 g solution to 1 g zeolite to 3 g solution.

It should be noted that the $SiO_2/Al_2O_3$ ratio of the as-synthesized zeolite affects the degree in which the caustic solution modifies the pore size. As a general rule, the more alumina in the zeolite framework (i.e., lower the $SiO_2/Al_2O_3$ ratio), the more difficult it will be to remove silica from the lattice of the zeolite (and hence modify the porosity). ZSM-5 crystals with $SiO_2/Al_2O_3$ ratios below about 35-40 will require a more aggressive caustic solution in order to achieve the optimized porosity modification. For these materials, a caustic solution with a normality of approximately 0.4N will have a minimal impact on the zeolite porosity. ZSM-5 crystals with $SiO_2/Al_2O_3$ ratios greater than about 100-120 will require a less aggressive caustic solution in order to achieve the optimized porosity modification. For these materials, an overly aggressive caustic solution will lead to excessive dissolution of the zeolite.

Therefore, the aluminum content of the as-synthesized zeolite employed as a raw material in this invention will greatly affect the performance of the resulting EtO removal media. For example, acidified mesoporous zeolite produced from ZSM-5 containing a minimal amount of aluminum ($SiO_2/Al_2O_3$ greater than about 1,000) will not effectively filter EtO because of the small number of acid sites. Therefore, it is desired that the $SiO_2/Al_2O_3$ ratio of the acidified mesoporous zeolite produced from ZSM-5 be less than about 200, with the preferred $SiO_2/Al_2O_3$ ratio between about 90 and about 20.

Following treatment with the caustic agent, the resulting mesoporous zeolite is separated from the caustic solution, such as for example by filtration. It is preferable to wash the filtered mesoporous zeolite deionized (DI) water until neutral, or washed to neutrality using a mildly acidic DI water solution.

Following the porosity modification step as described above, the mesoporous zeolite, or pore size modified zeolite, is acidified in order to maximize filtration performance. Acidification of the pore size modified zeolite is necessary in order to facilitate the hydrolysis of EtO. Acidification may be performed using techniques well known to one skilled in the art, such as for example ion exchange. Acidification of the pore size modified zeolite provides the necessary acid sites to catalyze the hydrolysis of EtO. Following pore size modification, mesoporous zeolite is a powder consisting of crystals typically less than about 50 μm in length.

Acidification of the mesoporous zeolite is typically accomplished through cation exchange reactions using techniques known to one skilled in the art. For example, cation exchange may be performed by slurrying the mesoporous zeolite in water, heating the water to approximately 120° F. to 190° F. (50° C. to 90° C.), then adding an ammonium salt solution, such as for example ammonium chloride, ammonium bisulfate, or the like to the slurry. After slurrying, the cation exchanged mesoporous zeolite is filtered from the solution, dried and calcined at an elevated temperature, such as, for example, 1000° F. (550° C.). Calcination of the ion exchanged, mesoporous zeolite results in decomposition of the ammonium complex, resulting in a proton as the charge balancing cation; whereby the proton constitutes the acid site.

Following caustic treatment and subsequent ion exchange, the acidified mesoporous zeolite exists as small crystals. According to various embodiments of the present invention, the zeolite may be configured in the form of particles, rings, cylinders, spheres, and the like. Alternatively, the acidified mesoporous zeolite, may be configured as a monolith, or coated onto the walls of a ceramic material, such as for example honeycomb corderite. Failure to configure the acidified mesoporous zeolite (e.g., m-H-ZSM-5 crystals) as described above will result in excessive pressure drop across the filtration media. Configuring the zeolite, preferably m-H-ZSM-5 crystals, into various geometrical shapes can be performed using operations well known to one skilled in the art. These techniques include pilling, extruding, and the like. Binders, such as for example clays, silicates, plastics, and the like, may or may not be required for the given application; however, the use of binders in the formation of zeolite rings, particles, and the like, is preferred.

The acidified forms of mesoporous zeolites of the pentasil family, such as, for example m-H-ZSM-8, m-H-ZSM-11, and the like, are also within the scope of the present invention. However, m-H-ZSM-5 is the preferred zeolite-based filtration media.

Often times, it is desired that the filtration material be capable of removing a range of chemicals from streams of air, such as for example epoxides, amines, nitriles, aldehydes, and the like. Because the novel process described herein is able to filter EtO, an epoxide, the novel process can also be applied to the removal of additional epoxides, such as for example propylene oxide, and the like. Further, because the novel process described herein employs acid sites to remove EtO, the novel process can also be applied to the removal of basic chemicals including aldehydes such as, for example, formaldehyde, and amines such as, for example, ammonia, from process streams (e.g., ambient air streams). Further, the novel process can be applied to multi-use applications, such as for example applications requiring the removal of multiple epoxides, or removal of EtO plus additional basic chemicals from streams of air.

Should it be desired that the novel process described herein be employed in a multi-use application, such as for example a process requiring the removal of EtO and basic chemicals including aldehydes such as, for example, formaldehyde, and amines such as, for example, ammonia, from process streams (e.g., ambient air streams), a preferred process will involve use of m-H-ZSM-5 particles prepared using an acidified binder material, or particles that are impregnated with acids or acid precursors, such as for example sulfuric acid, hydrochloric acid, ammonium bisulfate, ammonium chloride, ammonium fluoride, ammonium nitrate, citric acid, formic acid, and the like.

Acidification of binder material can be performed using techniques known to one, skilled in the art, such as for example impregnating the preferred m-H-ZSM-5 particles with solutions containing ammonium bisulfate, ammonium chloride, and the like, followed by calcination at an elevated temperature sufficient to decompose the ammonium complex. Organic acids, such as for example citric acid, can also be impregnated into the zeolite particles. Such a treatment will result in zeolite particles with an acidic binder, with the acidity of the binder resulting from the presence of for example sulfate, chloride, and the like. Alternatively, the binder material can be acidified through the addition of acid precursors to the binder, such as for example the addition of aluminum sulfate to the binder. Additionally, basic chemical filtration performance can be added to the particles via impregnation with metal sulfates, chlorides, and the like.

In a further embodiment of the present invention, the process for making the zeolite-based filtration media useful for removing epoxides from a process stream begins with calcining the zeolite, preferably ZSM-5, at an elevated temperature of from about 750° F. to 1200° F. (400° C. to 650° C.) for a sufficient time of from about 2 to 6 hours to remove organic residues such as an organic templating agent (e.g., tetrapropylammonium bromide). This calcination step is not required for zeolite prepared in a template-free form. A caustic solution is prepared comprising a caustic agent such as sodium hydroxide at a concentration of from about 0.01 N to 5.0 N, and preferably from about 0.1 N to 1.0 N. The calcined zeolite is slurried in the caustic solution at a temperature of from about 70° F. to 212° F. (20° C. to 100° C.), and preferably from about 120° F. to 190° F. (50° C. to 90° C.), for about 5 minutes to 24 hours, and preferably for about 15 minutes to 2 hours. The treatment of the zeolite with the caustic solution yields a mesoporous zeolite comprising mesopores with pore sizes of at least 2 nm in diameter. It is understood that various methods may be used for the caustic or alkaline treatment, including use of various caustic solutions, such as potassium hydroxide (KOH), as well as other alkaline/caustic solutions.

Following the caustic treatment, the mesoporous zeolite is filtered from the caustic solution, and washed to a neutral pH. The filtered mesoporous zeolite is then dried. The mesoporous zeolite is cation exchanged or acidified to produce acid sites useful for catalyzing the hydrolysis of epoxides. The acidification of the mesoporous zeolite is implemented using conventional techniques known in the art such as ion exchange reactions.

The mesoporous zeolite may be cation exchanged, for example, by mixing with water and heating the resulting mixture to a temperature of from about 120° F. to 210° F. (50° C. to 95° C.). An ammonium salt such as, for example, ammonium chloride, ammonium bisulfate and the like, is added to the mixture for a sufficient time to ensure sufficient reaction efficiency. The cation-exchanged zeolite is filtered from the mixture. The filtered zeolite is dried and calcined at about 1000° F. (550° C.) for a sufficient time to decompose the ammonium complex to yield an acid form of the mesoporous zeolite. This results in a proton as the charge balancing cation in which the proton constitutes the acid site.

Optionally, the acid form of the mesoporous zeolite can be prepared in combination with a binder, and preferably, an acidified binder or particles impregnated with acid such as, for example, sulfuric acid, hydrochloric acid, ammonium bisulfate, ammonium chloride, ammonium fluoride, ammonium nitrate, citric acid, formic acid, and combinations thereof, and the like, or an acid precursor, such as, for example, metal sulfates (e.g., aluminum sulfate), chlorides, and the like. Preferably, the binder is selected from clays, silicates, plastics and the like. Acidification of the binder can be performed using techniques known in the art. Organic acids, such as, for example, citric acid, can also be used to impregnate the mesoporous zeolite. Alternatively, the binder can be acidified through the addition of acid precursors to the binder, such as, aluminum sulfate.

Should it be desired that the process described herein be employed in a multiuse application, such as for example a process requiring the removal of ethylene oxide, and basic chemicals including aldehydes such as, for example, formaldehyde, and amines such as, for example, ammonia, from process streams (e.g., ambient air streams), a preferred process will involve use of the acid form of mesoporous zeolite particles prepared using an acidified binder material, or particles that are impregnated with acids or acid precursors, such as for example sulfuric acid, hydrochloric acid, ammonium bisulfate, ammonium chloride, ammonium fluoride, ammonium nitrate, citric acid, formic acid, and the like. Acidification of binder material can be performed using techniques known to one skilled in the art such as, for example, impregnating the preferred acid form of the mesoporous zeolite particles with solutions containing an acid selected, for example, from ammonium bisulfate, ammonium chloride, and the like, followed by calcination at an elevated temperature sufficient to decompose the ammonium complex.

Organic acids, such as for example citric acid, can also be impregnated into the zeolite particles. Such a treatment will result in zeolite particles with an acidic binder, with the acidity of the binder resulting from the presence of for example sulfate, chloride, and the like. Alternatively, the binder material can be acidified through the addition of acid precursors to the binder, such as for example the addition of aluminum sulfate to the binder. Additionally, basic chemical filtration performance can be added to the particles via impregnation with metal sulfates, chlorides, and the like.

The following examples serve to provide further appreciation of the invention but are not meant in any way to restrict the effective scope of the invention.

EXAMPLES

Laboratory scale tests were performed to evaluate the ability of the novel process to remove EtO from ambient air streams. A description of the laboratory scale test stand follows: A stream of compressed air delivered from a mass flow controller was delivered to a water sparger located within a temperature controlled water bath. Controlling the temperature of the water sparger controlled the water content of the air stream. The RH of the process stream (EtO free basis) was determined based on the change in mass of the water sparger and the volume of air passing through the water sparger. Neat EtO delivered from a second mass flow controller was blended with the process stream downstream of the water sparger. A small portion of the EtO/humid air stream was delivered to a gas chromatograph for analysis of the feed stream. The EtO/humid air stream was delivered to the filtration test assembly. The filtration test assembly consisted of a glass tube fitted with a porous glass frit sufficient to support the bed of filtration media. A portion of the stream exiting the filter bed was delivered to a gas chromatograph used to quantitatively determine the concentration of EtO in the filter effluent stream.

When performing tests under conditions of high RH, the filtration media was pre-humidified overnight in an environmental chamber at 80° F. (27° C.), 80% RH. All tests were performed at 77° F. (25° C.) at either 15% RH or 80% RH. All breakthrough times are reported corresponding to an effluent EtO concentration of 1.8 mg/m$^3$.

Figure 1:
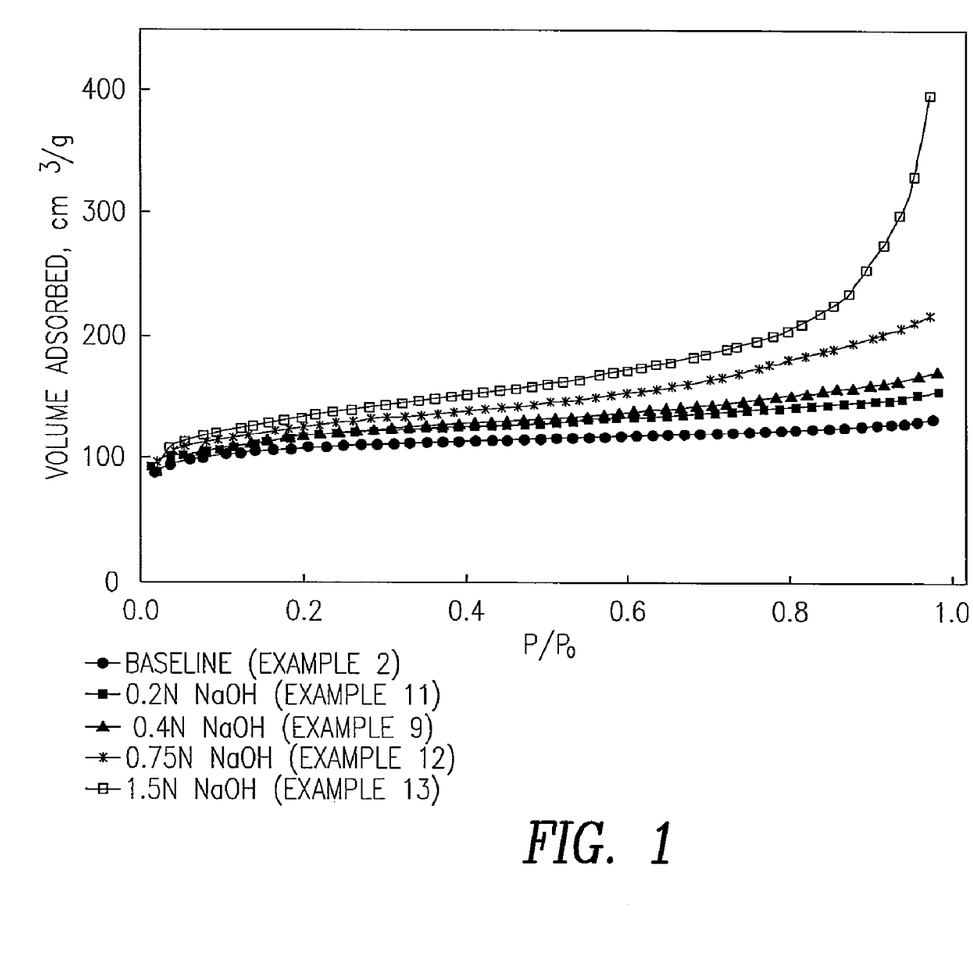
FIG. 1 is a graph comparing the $N_2$ absorption profiles of ZSM-5 filtration media each treated with a caustic agent (sodium hydroxide) at different concentrations in accordance with the present invention. The increase in porosity resulting from the caustic treatment is evident from the increase in the volume of $N_2$ adsorbed.

$N_2$ BET isotherms were recorded for all samples disclosed in this invention. These data were used to determine the surface area and pore volume of the corresponding samples. Isotherms illustrating the effects of the caustic treatment on the porosity of the zeolite are reported in FIG. 1.

Example 1

Synthesis of ZSM-5

Zeolite ZSM-5 was synthesized by adding 8,400 grams of LUDOX™ colloidal silica to a high shear mixer with a 5-gallon capacity. 175 g of sodium hydroxide, 235 grams of sodium aluminate, 925 grams of tetrapropylammonium bromide, and 5,250 grams of deionized water were added to the silica colloid. The resulting synthesis gel was thoroughly mixed under high shear. Upon completion of the mixing, the gel was added to a 5 liter TEFLON™ lined autoclave and heated in a forced air convection oven at 355° F. (180° C.) for about 72 hours to initiate crystallization. Upon completion of the crystallization process, the autoclave was removed from the oven and allowed to cool to room temperature. Once cooled, the resulting product, zeolite, was removed from the autoclave, filtered from the mother liquor, and then washed repeatedly to neutrality using 4 gallons of deionized water each time to remove the excess sodium.

Following the final washing operation, the zeolite was dried overnight at about 230° F. (110° C.), and then calcined at 1200° F. (650° C.) for 6 hours in order to remove the organic cation (tetrapropyl ammonium). The $SiO_2/Al_2O_3$ ratio of the zeolite was determined to be 52 using Proton Induced X-Ray Emissions (PIXE) analysis.

Example 2

Preparation of Acidified ZSM-5 (H-ZSM-5) via Ion Exchange

The zeolite from Example 1 was acidified by ion exchange, and then formed into 60×140 and 25×35 mesh granules. The ion exchange operation involved the mixing of 125 g $NH_4NO_3$ with 500 ml DI water, and heating the resulting solution to a temperature of about 195° F. (90° C.). At this temperature, 100 g of the washed zeolite from Example 1 was added to the heated solution and remained in contact with the solution for about 2 hours. Following ion exchange, the acidified zeolite was filtered, washed with 500 ml DI water, refiltered, and then dried at about 255° F. (125° C.). A 3 g portion of the zeolite was calcined at about 1000° F. (550° C.) for about 2 hours. The acidity of the calcined zeolite, H-ZSM-5, was determined by slurrying 1 g of zeolite crystals in 50 ml of DI water and recording the pH. The pH of the slurry was 3.91, indicating that the zeolite was acidic. The surface area and pore volume of the calcined zeolite, H-ZSM-5, were determined to be 368 m$^2$/g and 0.209 cm$^3$/g, respectively.

75 g of the zeolite ($NH_4$-ZSM-5) was added to a 400 ml beaker. To the beaker was added a solution consisting of 56.25 g zirconium oxynitrate (20% $ZrO_2$ by weight) and 18.75 g Ludox colloidal silica solution (40% $SiO_2$ by weight). The resulting dough was blended by hand, and then dried at about 230° F. (110° C.). The dried dough was crushed and sieved to 60×140 and 25×35 mesh particles. The sized particles were then placed in a furnace and calcined at about 950° F. (525° C.) for about 2 hours.

Example 3

Sodium Hydroxide Treatment of Zeolite 400 mL of deionized water was added to a tetrafluoroethylene (TFE) jar. 6.4 grams of NaOH pellets were dissolved in the water while stirring to yield a 0.4 N solution. The solution was heated to about 180° F. (82° C.) on a stirring hot plate. 75 grams of ZSM-5 of Example 1 were added to the solution. After 1 hour, the resulting mesoporous zeolite was filtered from the solution and then washed with 500 mL of deionized water. The temperature at the end of the operation was about 171° F. (77.5° C.). The washing operation was repeated two more times.

Example 4

Ion Exchange of Mesoporous Zeolite

The mesoporous zeolite of Example 3 was treated to an ion exchange process. 100 grams of ammonium nitrate ($NH_4NO_3$) were added to 500 mL of deionized water. The resulting solution was heated to 190° F. (90° C.). Once at temperature, the washed mesoporous zeolite of Example 3 was added and remained in the solution for about 3 hours. Following the exchange, the resulting the treated mesoporous zeolite was filtered and washed with 500 mL of deionized water. The treated mesoporous zeolite was refiltered and dried at about 230° F. (110° C.). A 3-gram portion of the treated mesoporous zeolite was calcined at about 1000° F. (550° C.) for about 2 hours to yield the acid form of the mesoporous zeolite.

1.0 gram of the acid form of the mesoporous zeolite was slurried in 50 mL of deionized water. The pH of the slurry was measured at about 3.87. The physical properties of the acid form of the mesoporous zeolite as compared to baseline or control (untreated acidified zeolite of Example 2) are shown in Table 1 below.

TABLE 1

| Sample | [NaOH] | PH | Surface Area $(m^2/g)$ | Pore Volume $(cm^3/g)$ |
|---|---|---|---|---|
| Baseline (Control) of Ex. 2 | None | 3.91 | 365 | 0.215 |
| Acidified mesoporous zeolite of Ex. 4 | 0.4 N | 3.87 | 375 | 0.253 |

Example 5

Preparation of Zeolite Particles

The zeolite particles forming part of the zeolite-based filtration media were prepared by blending the acid form of the mesoporous zeolite of Example 4 with a clay binder in proportions of about 100 parts zeolite and 25 parts clay. The blended dough was first dried at about 230° F. (110° C.), and then calcined at about 950° F. (525° C.) for about 2 hours. The bound acid form of the mesoporous zeolite was then crushed and sieved to 60×140 mesh and 25×30 mesh granules.

Example 6

Ethylene Oxide Filtration Testing

Ethylene oxide was selected as a representative epoxide. Results were obtained by challenging a 1.0 cm deep bed of 60×140 mesh filtration media with 1000 mg/m³ ethylene oxide in 80% relative humidity (RH) air flowing at a linear velocity of about 6.6 cm/sec at 77° F. (25° C.). The material was prehumidified overnight at 80% RH, 80° F. (27° C.) prior to testing. The breakthrough concentration of ethylene oxide was about 1.8 mg/m³.

Ethylene oxide filtration results corresponding to the baseline (control) of Example 2 and the bound acid form of the mesoporous zeolite of Example 4 are shown below in Table 2.

TABLE 2

| Sample | Ethylene Oxide Breakthrough Time |
|---|---|
| Baseline (Control) of Ex. 2 | 47 minutes |
| Acidified mesoporous zeolite of Ex. 4 | 99 minutes |

The improvement in performance is attributed to enhancements in the intrazeolithic mass transfer resulting from the increased porosity of the acid form of the mesoporous zeolite.

Example 7

400 ml DI water was placed in a TFE jar. 6.4 g of NaOH pellets were dissolved in the water at room temperature while stirring. The resulting solution is 0.4N NaOH. Once dissolved, 75 g of ZSM-5 from Example 1 were added to the solution and mixed. Following 1 hour, the zeolite was filtered from the solution, then washed with 500 pm DI water. The washing operation was repeated two additional times.

Once washed, the resulting zeolite was ion exchanged. The ion exchange operation involved the mixing of 100 g NH$_4$NO$_3$ with 500 ml DI water, and heating the resulting solution to 190° F. (90° C.). At this temperature, the washed zeolite was added and remained in contact with the solution for 5 hours. Following ion exchange, the zeolite was filtered, washed with 500 ml DI water, re-filtered, and then dried at about 110° C. A 3 g portion of the ion exchanged zeolite was calcined at 1000° F. (550° C.) for about 2 hours. The acidity of the calcined zeolite, m-H-ZSM-5, was determined by slurrying 1 g of zeolite crystals in 50 ml of DI water and recording the pH. The pH of the slurry was 3.82, indicating that the zeolite was acidic. The surface area and pore volume of the calcined zeolite, m-H-ZSM-5, were determined to be 385 m²/g and 0.246 cm³/g, respectively. Note that the pore volume represents an 18% increase in porosity relative to the baseline zeolite of Example 2.

66.4 g of NH$_4$-exchanged zeolite (m-NH$_4$-ZSM-5) was added to a 400 ml beaker. To the beaker was added a solution consisting of 49.725 g zirconium oxynitrate (20% ZrO$_2$ by weight) and 16.575 g Ludox colloidal silica solution (40% SiO$_2$ by weight). The resulting dough was blended by hand, and then dried at about 110° C. The dried dough was crushed and sieved to 60×140 and 25×35 mesh particles. The sized particles were then placed in a furnace and calcined at about 950° F. (525° C.) for about 2 hours.

Example 8

400 ml DI water was placed in a TFE jar. 6.4 g of NaOH pellets were dissolved in the water while stirring. The resulting solution is 0.4N NaOH. The solution was heated to about 125° F. (51.9° C.) on a stirring hot plate, at which time 75 g of ZSM-5 from Example 1 were added. Following 1 hour, the zeolite was filtered from the solution, and then washed with 500 pm DI water. The temperature at the end of the operation was about 135° F. (57.3° C.). The washing operation was repeated two additional times.

Once washed, the zeolite was ion exchanged. The ion exchange operation involved the mixing of 100 g NH$_4$NO$_3$ with 500 ml DI water, and heating the resulting solution to about 190° F. (90° C.). At this temperature, the washed zeolite was added and remained in contact with the solution for 4 hours. Following ion exchange, the zeolite was filtered, washed with 500 ml DI water, re-filtered, and then dried at about 230° F. (110° C.). A 3 g portion of the ion exchanged zeolite was calcined at about 950° F. (525° C.) for about 2 hours. The acidity of the calcined zeolite, m-H-ZSM-5, was determined by slurrying 1 g of zeolite crystals in 50 ml of DI water and recording the pH. The pH of the slurry was 3.63, indicating that the zeolite was acidic. The surface area and pore volume of the calcined zeolite, m-H-ZSM-5, were determined to be 399 m²/g and 0.268 cm³/g, respectively. Note that the pore volume represents a 28% increase in porosity relative to the baseline zeolite of Example 2.

60.52 g of NH$_4$-exchanged zeolite (m-NH$_4$-ZSM-5) was added to a 400 ml beaker. To the beaker was added a solution consisting of 45.39 g zirconium oxynitrate (20% ZrO$_2$ by weight) and 15.13 g Ludox colloidal silica solution (40% SiO$_2$ by weight). The resulting dough was blended by hand, and then dried at about 230° F. (110° C.). The dried dough was crushed and sieved to 60×140 and 25×35 mesh particles. The sized particles were then placed in a furnace and calcined at about 950° F. (525° C.) for about 2 hours.

Example 9

400 ml DI water was placed in a TFE jar. 6.4 g of NaOH pellets were dissolved in the water while stirring. The resulting solution is 0.4N NaOH. The solution was heated to about 171° F. (77.4° C.) on a stirring hot plate, at which time 75 g of ZSM-5 from Example 1 were added. Following 1 hour, the zeolite was filtered from the solution, and then washed with 500 pm DI water. The temperature at the end of the operation was about 173° F. (78.2° C.). The washing operation was repeated two additional times.

Once washed, the zeolite was ion exchanged. The ion exchange operation involved the mixing of 100 g $NH_4NO_3$ with 500 ml DI water, and heating the resulting solution to about 190° F. (90° C.). At this temperature, the washed zeolite was added and remained in contact with the solution for 3.5 hours. Following ion exchange, the zeolite was filtered, washed with 500 ml DI water, re-filtered, and then dried at about 230° F. (1.10° C.). A 3 g portion of the ion exchanged zeolite was calcined at 1000° F. (550° C.) for about 2 hours. The acidity of the calcined zeolite, m-H-ZSM-5, was determined by slurrying 1 g of zeolite crystals in 50 ml of DI water and recording the pH. The pH of the slurry was 3.73, indicating that the zeolite was acidic. The surface area and pore volume of the calcined zeolite, m-H-ZSM-5, were determined to be 391 $m^2/g$ and 0.265 $cm^3/g$, respectively. Note that the pore volume represents a 27% increase in porosity relative to the baseline zeolite of Example 2.

60.61 g of $NH_4$-exchanged zeolite (m-$NH_4$-ZSM-5) was added to a 400 ml beaker. To the beaker was added a solution consisting of 45.46 g zirconium oxynitrate (20% $ZrO_2$ by weight) and 15.15 g Ludox colloidal silica solution (40% $SiO_2$ by weight). The resulting dough was blended by hand, and then dried at about 230° F. (110° C.). The dried dough was crushed and sieved to 60×140 and 25×35 mesh particles. The sized particles were then placed in a furnace and calcined at about 950° F. (525° C.) for about 2 hours.

Example 10

400 ml DI water was placed in a TFE jar. 6.4 g of NaOH pellets were dissolved in the water while stirring. The resulting solution is 0.4N NaOH. The solution was heated to boil (206° F., 96.9° C.) on a stirring hot plate, at which time 75 g of ZSM-5 of Example 1 were added. A watch glass filled with ice was placed above the TFE jar to minimize evaporative losses of water. Following 1 hour, the zeolite was filtered from the solution, and then washed with 500 pm DI water. The temperature at the end of the operation was about 206° F. (96.6° C.), with the solution remaining under boil throughout the operation. The washing operation was repeated two additional times.

Once washed, the zeolite was ion exchanged. The ion exchange operation involved the mixing of 100 g $NH_4NO_3$ with 500 ml DI water, and heating the resulting solution to about 190° F. (90° C.). At this temperature, the washed zeolite was added, and remained in contact with the solution for about 5.5 hours. Following ion exchange, the zeolite was filtered, washed with 500 ml DI water, re-filtered, and then dried at about 230° F. (110° C.). A 3 g portion of the ion exchanged zeolite was calcined at about 1000° F. (550° C.) for about 2 hours. The surface area and pore volume of the calcined zeolite, m-H-ZSM-5, were determined to be 361 $m^2/g$ and 0.224 $cm^3/g$, respectively. Note that the pore volume represents a 7% increase in porosity relative to the baseline zeolite of Example 2.

Example 11

400 ml DI water was placed in a TFE jar. 3.2 g of NaOH pellets were dissolved in the water while stirring. The resulting solution is 0.2N NaOH. The solution was heated to 141° F. (60.7° C.) on a stirring hot plate, at which time 75 g of ZSM-5 from Example 1 were added. Following 1 hour, the zeolite was filtered from the solution, and then washed with 500 pm DI water. The temperature at the end of the NaOH treatment was 135° F. (57.5° C.). The washing operation was repeated two additional times.

Once washed, the zeolite was ion exchanged. The ion exchange operation involved the mixing of 100 g $NH_4NO_3$ with 500 ml DI water, and heating the resulting solution to about 190° F. (90° C.). At this temperature, the washed zeolite was added and remained in contact with the solution for about 4 hours. Following ion exchange, the zeolite was filtered, washed with 500 ml DI water, re-filtered, and then dried at about 230° F. (110° C.). A 3 g portion of the ion exchanged zeolite was calcined at about 950° F. (525° C.) for about 2 hours. The surface area and pore volume of the calcined zeolite, m-H-ZSM-5, were determined to be 389 $m^2/g$ and 0.244 $cm^3/g$, respectively. Note that the pore volume represents a 17% increase in porosity relative to the baseline zeolite of Example 2.

68.0 g of $NH_4$-exchanged zeolite (m-$NH_4$-ZSM-5) was added to a 400 ml beaker. To the beaker was added a solution consisting of 51.0 g zirconium oxynitrate (20% $ZrO_2$ by weight) and 17.0 g Ludox colloidal silica solution (40% $SiO_2$ by weight). The resulting dough was blended by hand, and then dried at about 80° C. The dried dough was crushed and sieved to 60×140 and 25×35 mesh particles. The sized particles were then placed in a furnace and calcined at about 950° F. (525° C.) for about 2 hours.

Example 12

400 ml DI water was placed in a TFE jar. 12.0 g of NaOH pellets were dissolved in the water while stirring. The normality of the solution is 0.75N NaOH. The solution was heated 127° F. (53.2° C.) on a stirring hot plate, at which time 75 g of ZSM-5 from Example 1 were added. Following 1 hour, the zeolite was filtered from the solution, and then washed with 500 pm DI water. The temperature at the end of the operation was about 142° F. (61.2° C.). The washing operation was performed by slurrying the zeolite in 500 ml DI water, and then adjusting the pH to 10 using nitric acid and allowing the washing operation to proceed for 30 minutes. This, operation was repeated with the pH reduced to 9, then repeated a third time, reducing the pH to 7. The acid washing was employed due to the high sodium content of the treatment.

Once washed, the zeolite was ion exchanged. The ion exchange operation involved the mixing of 100 g $NH_4NO_3$ with 500 ml DI water, and heating the resulting solution to about 190° F. (90° C.). At this temperature, the washed zeolite was added and remained in contact with the solution for about 5 hours. Following ion exchange, the zeolite was filtered, washed with 500 ml DI water, re-filtered, and then dried at about 230° F. (110° C.). A 3 g portion of the ion exchanged zeolite was calcined at about 1000° F. (550° C.) for about 2 hours. The surface area and pore volume of the calcined zeolite, m-H-ZSM-5, were determined to be 416 $m^2/g$ and 0.338 $cm^3/g$, respectively. Note that the pore volume represents a 62% increase in porosity relative to the baseline zeolite of Example 2.

50.5 g of $NH_4$-exchanged zeolite (m-$NH_4$-ZSM-5) was added to a 400 ml beaker. To the beaker was added a solution consisting of 37.87 g zirconium oxynitrate (20% $ZrO_2$ by weight) and 12.62 g Ludox colloidal silica solution (40% $SiO_2$ by weight). The resulting dough was blended by hand, and then dried at about 90° C. The dried dough was crushed and sieved to 60×140 and 25×35 mesh particles. The sized particles were then placed in a furnace and calcined at about 950° F. (525° C.) for about 2 hours.

Example 13

400 ml DI water was placed in a TFE jar. 24.0 g of NaOH pellets were dissolved in the water while stirring. The normality of the resulting solution is 1.5N NaOH. The solution was heated 145° F. (63.0° C.) on a stirring hot plate, at which time 75 g of ZSM-5 from Example 1 were added. Following 1 hour, the zeolite was filtered from the solution, and then washed with 500 pm DI water. The temperature at the end of the operation was about 136° F. (57.9° C.). The washing operation was repeated by slurrying the zeolite in 500 ml DI water, and then adjusting the pH to 10 using nitric acid and allowing the washing operation to proceed for about 30 minutes. This operation was repeated with the pH reduced to 9, and then repeated a third time, reducing the pH to 7. The acid washing was employed due to the high sodium content of the treatment. Approximately 32 g of zeolite was recovered.

Once washed, the zeolite was ion exchanged. The ion exchange operation involved the mixing of 100 g $NH_4NO_3$ with 500 ml DI water, and heating the resulting solution to about 190° F. (90° C.). At this temperature, the washed zeolite was added and remained in contact with the solution for about 4 hours. Following ion exchange, the zeolite was filtered, washed with 500 ml Dl water, re-filtered, and then dried at about 230° F. (110° C.). A 3 g portion of the ion exchanged zeolite was calcined at 1000° F. (550° C.) for about 2 hours. The surface area and pore volume of the calcined zeolite, m-H-ZSM-5, were determined to be 445 $m^2/g$ and 0.616 $cm^3/g$, respectively. Note that the pore volume represents a 195% increase in porosity relative to the baseline zeolite of Example 2.

27.52 g of $NH_4$-exchanged zeolite (m-$NH_4$-ZSM-5) was added to a 400 ml beaker. To the beaker was added a solution consisting of 20.64 g zirconium oxynitrate (20% $ZrO_2$ by weight) and 6.88 g Ludox colloidal silica solution (40% $SiO_2$ by weight). The resulting dough was blended by hand, and then dried at about 190° F. (90° C.). The dried dough was crushed and sieved to 60×140 mesh particles. The sized particles were then placed in a furnace and calcined at about 950° F. (525° C.) for about 2 hours.

Example 14

ZSM-5 with a $SiO_2/Al_2O_3$ ratio of 25 was purchased from Engelhard Corporation of Iselin, N.J. (Lot 5002) in the $NH_4$- form. A 3 g portion of this material was calcined at 1000° F. (550° C.) for about 2 hours in order to activate the material. The acidity of the calcined zeolite, H-ZSM-5, was determined by slurrying 1 g of zeolite crystals in 50 ml of DI water and recording the pH. The pH of the slurry was 3.31, indicating that the zeolite was acidic. The surface area and pore volume of the calcined zeolite, H-ZSM-5, were determined to be 350 $m^2/g$ and 0.189 $cm^3/g$, respectively.

75 g of zeolite ($NH_4$-ZSM-5) were added to a 400 ml beaker. To the beaker was added a solution consisting of 56.25 g zirconium oxynitrate (20% $ZrO_2$ by weight) and 18.75 g Ludox colloidal silica solution (40% $SiO_2$ by weight). The resulting dough was blended by hand, and then dried at about 230° F. (110° C.). The dried dough was crushed and sieved to 60×140 and 25×35 mesh particles. The sized particles were then placed in a furnace and calcined at about 525° C. for about 2 hours.

Example 15

400 ml DI water was placed in a TFE jar. 8.0 g of NaOH pellets were dissolved in the water while stirring. The normality of the resulting solution is 0.5N NaOH. The solution was heated 139° F. (60° C.) on a stirring hot plate, at which time 76 g of ZSM-5 with a $SiO_2/Al_2O_3$ ratio of 25 obtained from Engelhard Corporation (see Example 14) were added. Following 1 hour, the zeolite was filtered from the solution, then washed with 500 pm DI water. The washing operation was repeated by slurrying the zeolite in 500 ml DI water, and then adjusting the pH to 8 using nitric acid and allowing the washing operation to proceed for about 30 minutes. The acid washing was employed due to the high sodium content of the treatment.

Once washed, the zeolite was ion exchanged. The ion exchange operation involved the mixing of 100 g $NH_4NO_3$ with 500 ml DI water, and heating the resulting solution to about 190° F. (90° C.). At this temperature, the washed zeolite was added and remained in contact with the solution for about 4 hours. Following ion exchange, the zeolite was filtered, washed with 500 ml DI water, re-filtered, and then dried at about 175° F. (80° C.). A 3 g portion of the ion exchanged zeolite was calcined at 550° C. for about 2 hours. The surface area and pore volume of the calcined zeolite, m-H-ZSM-5, were determined to be 361 $m^2/g$ and 0.203 $cm^3/g$, respectively. Note that the pore volume represents a 7% increase in porosity relative to the baseline zeolite of Example 14.

67 g of $NH_4$-exchanged zeolite (m-$NH_4$-ZSM-5) was added to a 400 ml beaker. To the beaker was added a solution consisting of 50.25 g zirconium oxynitrate (20% $ZrO_2$ by weight) and 16.75 g Ludox colloidal silica solution (40% $SiO_2$ by weight). The resulting dough was blended by hand, and then dried at about 190° F. (90° C.). The dried dough was crushed and sieved to 60×140 mesh particles and 25×35 mesh particles. The sized particles were then placed in a furnace and calcined at about 525° C. for about 2 hours.

Example 16

400 ml DI water was placed in a TFE jar. 16.0 g of NaOH pellets were dissolved in the water while stirring. The normality of the resulting solution is 0.5N NaOH. The solution was heated 139° F. (60° C.) on a stirring hot plate, at which time 78 g of ZSM-5 with a $SiO_2/Al_2O_3$ ratio of 25 obtained from Engelhard Corporation (see Example 14) were added. Following 1 hour, the zeolite was filtered from the solution, and then washed with 500 pm DI water. The washing operation was repeated by slurrying the zeolite in 500 ml DI water, and then adjusting the pH to 7 using nitric acid and allowing the washing operation to proceed for about 30 minutes. The acid washing was employed due to the high sodium content of the treatment.

Once washed, the zeolite was ion exchanged. The ion exchange operation involved the mixing of 100 g $NH_4NO_3$ with 500 ml DI water, and heating the resulting solution to about 190° F. (90° C.). At this temperature, the washed zeolite was added and remained in contact with the solution for about 4 hours. Following ion exchange, the zeolite was filtered, washed with 500 ml DI water, re-filtered, and then dried at about 175° F. (80° C.). A 3 g portion of the ion exchanged zeolite was calcined at 1000° F. (550° C.) for about 2 hours. The surface area and pore volume of the calcined zeolite, m-H-ZSM-5, were determined to be 383 m²/g and 0.294 cm³/g, respectively. Note that the pore volume represents a 56% increase in porosity relative to the baseline zeolite of Example 14.

58 g of NH₄-exchanged zeolite (m-NH₄-ZSM-5) was added to a 400 ml beaker. To the beaker was added a solution consisting of 43.5 g zirconium oxynitrate (20% $ZrO_2$ by weight) and 14.5 g Ludox colloidal silica solution (40% $SiO_2$ by weight). The resulting dough was blended by hand, and then dried at about 90° C. The dried dough was crushed and sieved to 60×140 mesh particles and 25×35 mesh particles. The sized particles were then placed in a furnace and calcined at about 525° C. for about 2 hours.

Example 17

Ethylene Oxide Filtration Testing 7.5 cm³ of the 60×140 mesh particles of H-ZSM-5 of Examples 2 and 14 and m-H-ZSM-5 of Examples 7 through 16 described above were each formed into a filtration media, and placed in a corresponding filter tube for a comparative analysis. The bed depth was 1.0 cm. The particles were challenged with 1,000 mg/m³ EtO at 77° F. (25° C.) in 80% RH air at a linear velocity of 6.6 cm/s (contact time=0.152 seconds). Each filtration media was pre-humidified at 80% RH, 80° F. (27° C.) overnight prior to initiating said testing. The EtO breakthrough time recorded for each material are shown below in Tables 3 and 4.

TABLE 3

EtO filtration results using ZSM-5 with $SiO_2/Al_2O_3$ = 52 as raw material

| Material | Temperature | [NaOH] | EtO Breakthrough Time |
| --- | --- | --- | --- |
| Example 2 (baseline) | | | 47 minutes |
| Example 7 | Room | 0.4 N | 70 min |
| Example 8 | 57° C. | 0.4 N | 67 minutes |
| Example 9 | 77° C. | 0.4 N | 99 minutes |
| Example 10 | Boiling | 0.4 N | 79 minutes |
| Example 11 | 58° C. | 0.2 N | 60 minutes |
| Example 12 | 57° C. | 0.75 N | 51 minutes |
| Example 13 | 60° C. | 1.5 N | 8 minutes |

With the exception of the material prepared using the 1.5N NaOH solution (Example 13), all materials treated with NaOH to enhance the porosity, displayed improvements in EtO filtration relative to the baseline material of Example 2.

TABLE 4

EtO filtration results using ZSM-5 with $SiO_2/Al_2O_3$ = 25 as raw material

| Material | Temperature | [NaOH] | EtO Breakthrough Time |
| --- | --- | --- | --- |
| Example 14 | | | 59 minutes |
| Example 15 | 60° C. | 0.5 N | 73 minutes |
| Example 16 | 60° C. | 1.0 N | 66 minutes |

All materials presented in the table above, displayed improved ethylene oxide filtration performance relative to the baseline material of Example 14.

Example 19

Ammonia Filtration Testing 7.5 cm³ of the 60×140 mesh particles of H-ZSM-5 of Example 2 and m-H-ZSM-5 of Example 8 described previously were each placed in a corresponding filter tube for evaluation as a filtration media versus $NH_3$. The bed depth was 1.0 cm. The particles were challenged with 1,000 mg/m³ $NH_3$ at 77° F. (25° C.) in either 15% or 80% RH air at a linear velocity of 6.6 cm/s (contact time=0.152 seconds). Each filtration media was pre-humidified at 80% RH, 80° F. (27° C.) overnight prior to initiating said testing at 80% RH. When testing at 15% RH, each filtration media was evaluated as-received. The $NH_3$ breakthrough time were recorded for each filtration media and shown in Table 5 below.

TABLE 5

| | | $NH_3$ Breakthrough Time | |
| --- | --- | --- | --- |
| Material | Treatment | 15% RH | 80% RH |
| Example 2 | None | 20 minutes | 15 minutes |
| Example 8 | 77° C., 0.4 N | 23 minutes | 15 minutes |

Results presented in the above table demonstrate that the m-H-ZSM-5 is capable of removing $NH_3$ from streams of dry and humid air.

The forgoing discussion discloses and describes merely exemplary embodiments of the present invention. One skilled in the art will readily recognize from such discussion, and from the accompanying claims, that various changes, modifications, and variations can be made therein without departing from the spirit and scope of the invention as defined in the following claims.

What is claimed is:

1. A process for removing epoxides from a process stream over a wide range of temperature and relative humidity, comprising the step of contacting the process stream with a filtration media comprising an acid form of a mesoporous zeolite produced from pentasil zeolite having an $SiO_2/Al_2O_3$ ratio from about 20 to less than about 200 treated with a strong base, for a sufficient time to remove the epoxides therefrom.

2. The process of claim 1, wherein the temperature of the process stream is from about −25° F. to 120° F.

3. The process of claim 1, wherein the relative humidity of the process stream is from about 5% to about 95%.

4. The process of claim 1, wherein the pentasil zeolite is selected from the group consisting of ZSM-5, ZSM-8, ZSM-11 and combinations thereof.

5. The process of claim 1, wherein the mesoporous zeolite further comprises a compound impregnated therein selected from the group consisting of sulfates, fluorides, chlorides, nitrates, metal salts, acids and precursors thereof, and combinations thereof.

6. The process of claim 5, wherein the acid is selected from the group consisting of sulfuric acid, hydrochloric acid, ammonium bisulfate, ammonium chloride, ammonium fluoride, ammonium nitrate, citric acid, formic acid, and combinations thereof.

7. The process of claim 1, wherein the mesoporous zeolite comprises pores having a diameter size in the range of from about 2 nm to 50 nm.

8. The process of claim 1, wherein the mesoporous zeolite comprises, a surface area of at least 375 m²/g.

9. The process of claim 1, wherein the mesoporous zeolite comprises a pore volume of at least 0.220 cm³/g.

10. The process of claim 1, wherein the strong base caustic agent is present in a solution at a concentration of from about 0.001N to 10.0N.

11. The process of claim 10, wherein the concentration is from about 0.1N to 1.0N.

12. The process of claim 1, wherein the strong base is a hydroxide.

13. The process of claim 12, wherein the hydroxide is selected from the group consisting of potassium hydroxide, barium hydroxide, cesium hydroxide, sodium hydroxide, strontium hydroxide, calcium hydroxide, lithium hydroxide, rubidium hydroxide, and combinations thereof.

14. The process of claim 1, wherein the zeolite-based filtration media is in a form selected from the group consisting of a particle, a bead, an extrusion or combinations thereof.

15. The process of claim 1, wherein the pentasil zeolite is ZSM-5.

16. The process of claim 1, wherein the pentasil zeolite has a $SiO_2/Al_2O_3$ ratio from about 30 to about 90.

17. A process for removing epoxides, amines and/or aldehydes from a process stream over a wide range of temperature and relative humidity, comprising the step of contacting the process stream with a filtration media comprising an acid form of a mesoporous zeolite produced from pentasil zeolite having an $SiO_2/Al_2O_3$ ratio from about 20 to less than about 200 treated with a strong base, for a sufficient time to remove the epoxides, amines and/or aldehydes therefrom, wherein said mesoporous zeolite further comprises a compound impregnated therein selected from the group consisting of sulfates, fluorides, chlorides, nitrates, metal salts, acids and precursors thereof, and combinations thereof.

18. The process of claim 16, wherein the acid is selected from the group consisting of sulfuric acid, hydrochloric acid, ammonium bisulfate, ammonium chloride, ammonium fluoride, ammonium nitrate, citric acid, formic acid, and combinations thereof.

19. The process of claim 17, wherein the mesoporous zeolite comprises pores having a diameter size in the range of from about 2 nm to 50 nm.

20. The process of claim 17, wherein the mesoporous zeolite comprises a surface area of at least 375 m²/g.

21. The process of claim 17, wherein the mesoporous zeolite comprises a pore volume of at least 0.220 cm³/g.

22. The process of claim 17, wherein the strong base is present in a solution at a concentration of from about 0.001N to 10.0N.

23. The process of claim 17, wherein the strong base is a hydroxide.

24. The process of claim 23, wherein the hydroxide is selected from the group consisting of potassium hydroxide, barium hydroxide, cesium hydroxide, sodium hydroxide, strontium hydroxide, calcium hydroxide, lithium hydroxide, rubidium hydroxide, and combinations thereof.

25. The process of claim 17, wherein the zeolite-based filtration media is in a form selected from the group consisting of a particle, a bead, an extrusion or combinations thereof.

* * * * *